July 31, 1934.  F. L. FURBUSH  1,968,757
ENDLESS CONVEYER
Filed Oct. 14, 1933  2 Sheets-Sheet 1
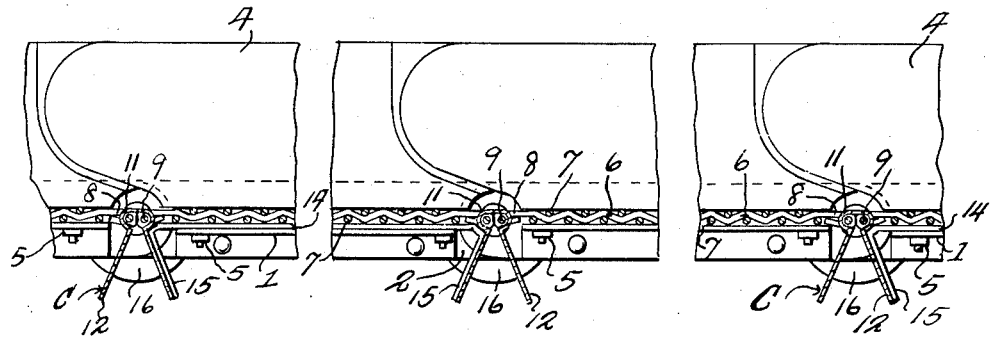
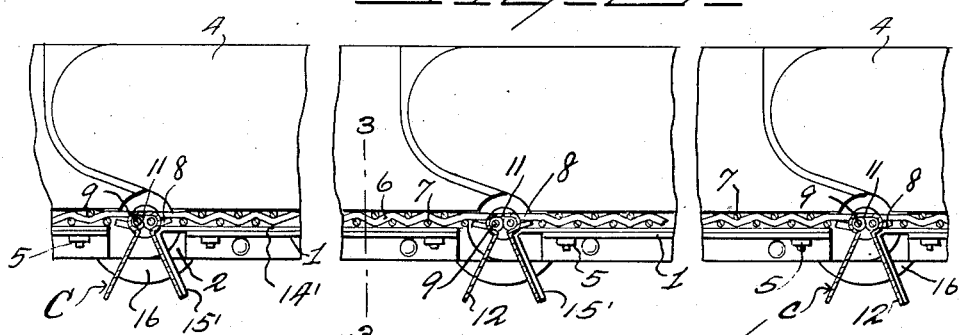
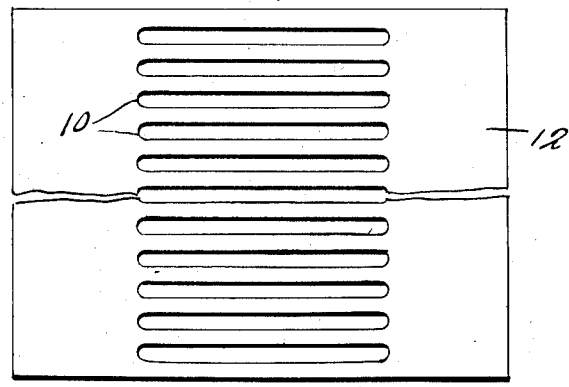
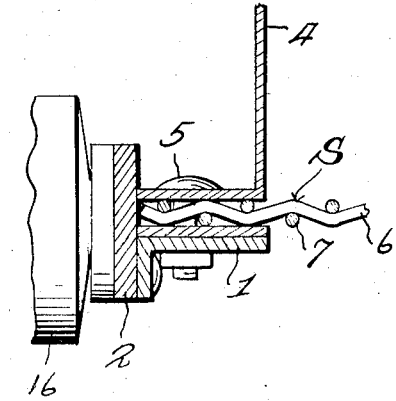
Inventor
F. L. Furbush
By Watson E. Coleman
Attorney July 31, 1934.  F. L. FURBUSH  1,968,757
ENDLESS CONVEYER
Filed Oct. 14, 1933   2 Sheets-Sheet 2
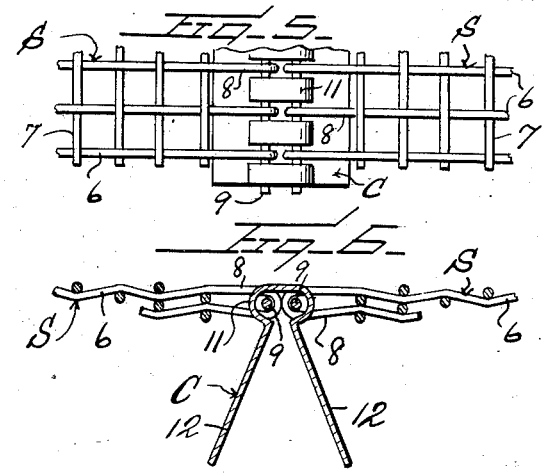
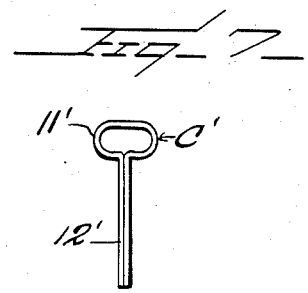
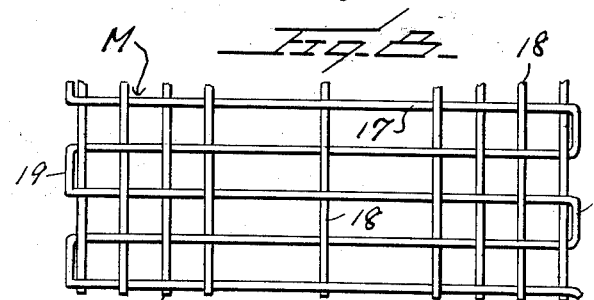
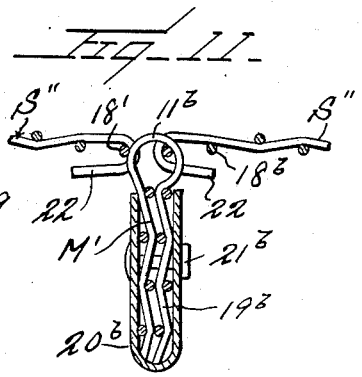
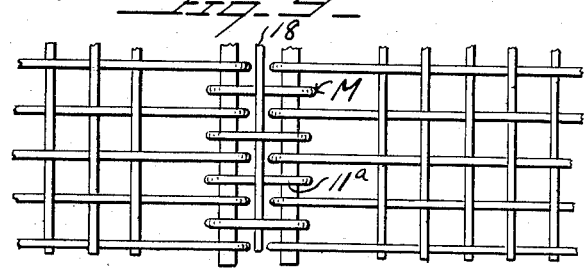
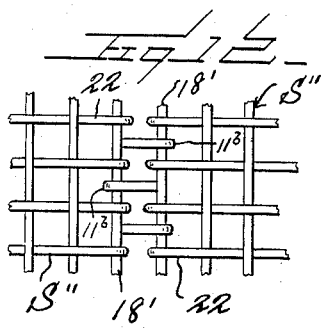
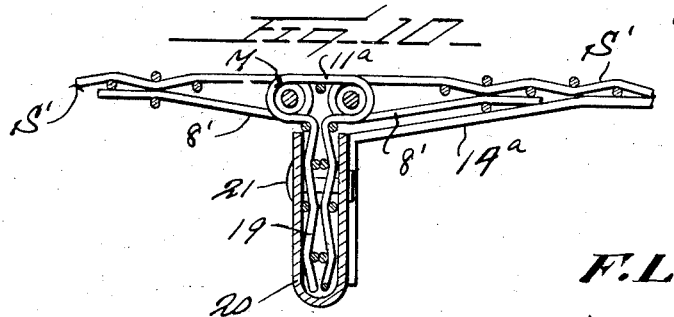
Inventor
F. L. Furbush
By Watson E. Coleman
Attorney Patented July 31, 1934

1,968,757

UNITED STATES PATENT OFFICE 1,968,757

ENDLESS CONVEYER

Frank L. Furbush, Graniteville, Mass., assignor to C. G. Sargent's Sons Corporation, Graniteville, Mass., a corporation of Massachusetts Application October 14, 1933, Serial No. 693,656

4 Claims. (Cl. 198—194)

This invention relates to endless conveyers comprising a plurality of sections or aprons, and it is primarily an object of the invention to provide a coupling member for connecting adjacent sections or aprons in a manner whereby the assembled sections or aprons present substantially a continuous conveyer but at the same time permitting sufficient flexibility or articulation to allow the conveyer to pass readily over or around the drums or pulleys employed in connection with conveyers such as this.

Another object of the invention is to provide a coupling member for adjacent sections or aprons of a conveyer which permits a ready connection or disconnection of adjacent sections or aprons as may be required and, furthermore, it is an object of the invention to provide means whereby the coupling member may be comprised in a section or apron as a unit.

An additional object of the invention is to provide a conveyer of this general type wherein a coupling member is provided to operatively connect adjacent sections or aprons of the conveyer and wherein said coupling member serves to strengthen the portions of the sections or aprons engaged therewith.

The invention consists in the details of construction and in the combination and arrangement of the several parts of my improved endless conveyer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view partly in section and partly in elevation illustrating a conveyer assembled in accordance with an embodiment of my invention;

Figure 2 is a view similar to Figure 1 but showing an assembly in accordance with another embodiment of my invention;

Figure 3 is an enlarged fragmentary detailed sectional view taken substantially on the line 3—3 of Figure 2 with certain of the parts in elevation;

Figure 4 is a fragmentary view in plan of the blank from which is formed a coupling member for use in connection with either of the assemblies illustrated in Figures 1 and 2;

Figure 5 is a fragmentary view in top plan showing the coupling member as illustrated in Figures 1 and 2 in operative engagement with adjacent sections or aprons;

Figure 6 is a longitudinal sectional view taken through Figure 5;

Figure 7 is a view in end elevation illustrating the coupling member in slightly modified form;

Figure 8 is a fragmentary view in top plan of a fabric from which is produced a coupling member constructed in accordance with a further embodiment of the invention;

Figure 9 is a view in top plan of the coupling member produced from the fabric as illustrated in Figure 8 and in working position;

Figure 10 is a longitudinal sectional view taken through the assembly as illustrated in Figure 9;

Figure 11 is a detailed sectional view illustrating a coupling member constructed in accordance with a still further embodiment of my invention;

Figure 12 is a view in top plan of the assembly illustrated in Figure 11.

As particularly illustrated in Figures 1 to 6 inclusive, the conveyer comprises a plurality of screen sections or aprons S having adjacent end portions operatively engaged with an interposed coupling member C. Each side marginal portion of a section or apron S overlies a supporting member 1 extending along and disposed inwardly of each elongated link 2 comprised in a side chain. Resting upon said overlying marginal portion of the section or apron S is a lateral flange 3 defining the inner longitudinal marginal portion of a side wall 4. Each of these walls is preferably of sheet metal and serves to retain the material upon the conveyer. The walls 4 are held in applied position by the bolts 5 or other desired fastening elements passing through the flanges 3, the supporting members 1 and the interposed marginal portions of the screen sections or aprons S. The extremities of the side walls 4 are formed in a manner to co-operate effectively to assure a substantially continuous wall at each side of the conveyer.

As herein disclosed, each of the sections or aprons S comprises a series of longitudinally extending wires 6 and transverse wires 7 spaced apart to provide a mesh illustrated in the accompanying drawings rectangular. At each end of the section or apron S the longitudinal wires 6 extend free and unobstructed a material distance beyond the adjacent transverse wires 7 and each of said extended portions is returned to provide an elongated eye member 8 which interdigitates with the coupling member C and held thereto by a holding pin or rod 9.

The coupling member C is formed from a blank of sheet metal of required dimensions as illustrated in Figure 4 and which blank has provided therealong at its transverse center a series of elongated parallel slots 10. These slots are comprised in the wall of an elongated tube-like member 11 provided upon proper folding of the blank and the marginal portions of the blank at opposite sides of the slots 10 provide stiffening webs 12 disposed in divergence with respect to the tubular member 11. The slots 10 provide openings disposed transversely of the member 11 and the eyes 8 hereinbefore referred to at the ends of the sections S, are inserted within said tubular member or head 11 through said openings and the pins or rods 9 hereinbefore referred to are disposed through the outer portions of the eye members 8 inserted within the tubular member or head 11.

As illustrated in Figure 7 the reinforcing members 12' of the coupling member C' may be in close contact with each other and substantially at right angles to the horizontal or longitudinal axis of the tubular member or head 11'.

The tubular member or head 11 of each of the coupling members C coacts with adjacent sections or aprons S to present a substantially continuous screen conveyer while the connection of the sections or aprons S with a coupling member C allows sufficient flexibility or articulation to permit the conveyer to readily pass over or around the drums or pulleys employed in connection with conveyers of this general type.

The coupling member C is preferably constructed of sheet steel although, of course, I do not wish to limit myself as to any special material.

As illustrated in Figure 1 interposed between the supporting member 1 and the overlying marginal portion of a screen section or apron S is a rigid strip 14, each end portion of which extending beyond the adjacent end of the supporting member 1 and being inwardly extended, as at 15, on an angle coincident to the angle of the adjacent stiffening web 12 of the coupling member C. Each of these portions 15 is welded or otherwise securely attached to the web 12 and in the assembly as illustrated in Figure 1 alternate sections or aprons S as a unit include a pair of coupling members C as a part thereof due to the interposed strip 14. The engagement of this strip 14 with the coupling members C maintains said coupling members against turning or swinging movement with respect to said section or apron S.

In the assembly as illustrated in Figure 2, the interposed strip 14' has only one end portion extended, as at 15', for connection with a web 12 of a coupling member C. In this assembly, therefore, each of the sections or aprons S has a single coupling member C substantially rigidly held with respect thereto. The members 14 or 14' also provide means to maintain the coupling members C in substantial alignment with the axial centers of the pivotal connections between adjacent links 2 of the chain and each of said pivotal connections for adjacent links also has associated therewith in a known manner a roller 16 for coaction with the usual trackways (not shown).

In the embodiment of the invention as illustrated in Figures 8, 9 and 10, the coupling member M comprises initially a blank of wire mesh consisting of longitudinal wires 17 and transverse wires 18. One of these transverse wires 18 is centrally arranged with respect to the blank and at opposite sides of this central wire 18 one or more transverse wires are omitted so that the eye members 8' at the ends of adjacent sections or aprons S' may readily enter the substantially tubular head 11ª formed by proper bending of the mesh blank at the transverse center thereof. The marginal portions of the member M constitute stiffening members 19 and, as illustrated in Figure 10, are arranged side by side in close relation. These members 19 are straddled from below by a reinforcing member 20 U-shaped in section and this member 20 is held in applied position by a desired number of bolts 21 or kindred fastening members. Each extremity of the member 20 has secured thereto an end portion of a strip 14ª adapted to be arranged and operating for the same purpose as the strips 14 or 14' hereinbefore referred to.

In Figures 11 and 12 the embodiment of the invention is substantially the same as that disclosed in Figures 8 to 10 except that the tubular member or head 11ᵇ is not elongated as the head 11ª and the head 11ᵇ includes spaced transverse wires 18ᵇ with which are adapted to be engaged the inwardly facing hook members 22 carried by the ends of the sections or aprons S''. The reinforcing members 19ᵇ of the coupling member M' are also straddled from below by a strengthening or reinforcing member 20ᵇ U-shaped in cross section and held in place by a desired number of bolts 21ᵇ.

From the foregoing description it is thought to be obvious that an endless conveyer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a conveyer, aprons having extending eye members at their ends, tubular coupling members interposed between adjacent aprons and having openings in their walls through which the eye members of adjacent aprons are disposed, and a pair of pins disposed through each coupling member, one of said pins being directed through the eyes of one apron and the second of said pins being directed through the eyes of a second apron, said pins cooperating with the associated coupling member to permit the coupling member to hold the adjacent ends of the aprons in swinging connection.

2. In a conveyer, aprons having extending eye members at their ends, tubular coupling members interposed between adjacent aprons and having openings in their walls through which the eye members of adjacent aprons are disposed, and a pair of pins disposed through each coupling member, one of said pins being directed through the eyes of one apron and the second of said pins being directed through the eyes of a second apron, said pins cooperating with the associated coupling member to permit the coupling member to hold the adjacent ends of the aprons in swinging connection, the eyes engaged with one pin being entirely free of the second pin.

3. In a conveyer, aprons having extending eye members at their ends, tubular coupling members interposed between adjacent aprons and having openings in their walls through which the eye members of adjacent aprons are disposed, and a pair of pins disposed through each coupling member, one of said pins being directed through the eyes of one apron and the second of said pins being directed through the eyes of a second apron, said pins cooperating with the associated coupling member to permit the coupling member to hold the adjacent ends of the aprons in swinging connection, the eyes of adjacent aprons interdigitating with the interposed coupling member, the eyes of one apron being independent of the eyes of the second apron.

4. A conveyer comprising side chains having corresponding long links, supports extending inwardly from said links, aprons, each having side marginal portions lapping the supports of corresponding links and secured thereto, the extremities of each apron having outstanding eye members spaced transversely thereacross, a tubular coupling member interposed between adjacent aprons and having slots in its wall to allow the eyes of the adjacent sections to interdigitate with said coupling member, a pair of pins extending through the tubular coupling member, one of said pins being also disposed through the eyes of one apron and the second pin disposed through the eyes of the second apron, and means carried by the supports engaging the coupling members to hold said coupling members against movement independently of certain of the aprons.

FRANK L. FURBUSH.